US010171111B2

(12) United States Patent
Peake (10) Patent No.: US 10,171,111 B2
(45) Date of Patent: Jan. 1, 2019

(54) GENERATING ADDITIONAL SLICES BASED ON DATA ACCESS FREQUENCY

(71) Applicant: International Business Machines Corporation, Armonk, NY (US)

(72) Inventor: Andrew G. Peake, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

(21) Appl. No.: 15/249,130

(22) Filed: Aug. 26, 2016

(65) Prior Publication Data

US 2017/0091032 A1 Mar. 30, 2017

Related U.S. Application Data

(60) Provisional application No. 62/222,819, filed on Sep. 24, 2015.

(51) Int. Cl.
*H03M 13/37* (2006.01)
*H04L 29/08* (2006.01)
(Continued)

(52) U.S. Cl.
CPC ........ *H03M 13/3761* (2013.01); *G06F 3/064* (2013.01); *G06F 3/067* (2013.01); *G06F 3/0611* (2013.01); *G06F 3/0614* (2013.01); *G06F 3/0619* (2013.01); *G06F 3/0653* (2013.01); *G06F 3/0659* (2013.01);
(Continued)

(58) Field of Classification Search
CPC ............ H03M 13/3761; H04L 67/1097; G06F 3/0653; G06F 3/067; G06F 3/0614
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Joseph D Torres
(74) *Attorney, Agent, or Firm* — Garlick & Markison; Timothy W. Markison; Shayne X. Short (57) ABSTRACT

A method for execution by a computing device of a dispersed storage network. The method begins by determining whether frequency of access to a set of encoded data slices exceeds a frequently accessed threshold. The method continues, when the frequency of access exceeds the frequently accessed threshold, by determining an access amount indicative of a degree that the frequency of access exceeds the frequently accessed threshold. The method continues by generating a number of additional encoded data slices and storing the number of additional encoded data slices in a number of additional storage units, wherein the set of storage units and the number of additional storage units produce an expanded set of storage units. The method continues by sending a plurality of data access requests to subsets of the expanded set of storage units in a distributed manner to improve processing efficiency of the plurality of data access requests.

14 Claims, 7 Drawing Sheets

(51) Int. Cl.
*G06F 3/06* (2006.01)
*H04L 29/06* (2006.01)
*G06F 8/65* (2018.01)
*G06F 11/10* (2006.01)
*H03M 13/15* (2006.01)

(52) U.S. Cl.
CPC .............. *G06F 3/0661* (2013.01); *G06F 8/65* (2013.01); *G06F 11/1092* (2013.01); *H03M 13/154* (2013.01); *H04L 63/061* (2013.01); *H04L 67/1097* (2013.01); *H04L 67/32* (2013.01); *H04L 67/34* (2013.01); *H03M 13/1515* (2013.01); *H04L 67/02* (2013.01); *H04L 67/06* (2013.01); *H04L 67/42* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,599,139 B1 * | 10/2009 | Bombet .................. G11B 5/09 360/31 |
| 7,636,724 B2 | 12/2009 | de la Torre et al. |
| 9,432,298 B1 * | 8/2016 | Smith .................. H04L 49/9057 |
| 9,684,558 B2 * | 6/2017 | Grube ..................... G06F 11/10 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0050053 A1 * | 2/2010 | Wilson ................ G06F 11/1068 714/773 |
| 2011/0029731 A1 * | 2/2011 | Cilfone ................ G06F 11/1076 711/114 |
| 2011/0106855 A1 * | 5/2011 | Resch ..................... H04L 12/00 707/793 |
| 2011/0314355 A1 * | 12/2011 | Grube .................. G06F 11/1076 714/763 |
| 2012/0054500 A1 * | 3/2012 | Dhuse .................. G06F 11/1076 713/189 |
| 2012/0137095 A1 * | 5/2012 | Grube .................. G06F 12/0638 711/162 |
| 2012/0254619 A1 * | 10/2012 | Dhuse .................... H04L 9/085 713/176 |
| 2013/0275843 A1 * | 10/2013 | Narayanan .......... G06F 11/1004 714/807 |
| 2014/0040417 A1 * | 2/2014 | Gladwin ............. G06F 11/2053 709/214 |
| 2016/0350187 A1 * | 12/2016 | Saliba ................. H03M 13/353 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RTC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

(56) References Cited

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

GENERATING ADDITIONAL SLICES BASED ON DATA ACCESS FREQUENCY

CROSS-REFERENCE TO RELATED APPLICATIONS

The present U.S. Utility Patent Application claims priority pursuant to 35 U.S.C. § 119(e) to U.S. Provisional Application No. 62/222,819, entitled "IDENTIFYING AN ENCODED DATA SLICE FOR REBUILDING", filed Sep. 24, 2015, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Over time, the rate at which data is accessed may change. Some of the data may be accessed more frequently than other data or more frequently than anticipated when the data was originally created and/or stored.

DETAILED DESCRIPTION OF THE INVENTION

Figure 1:
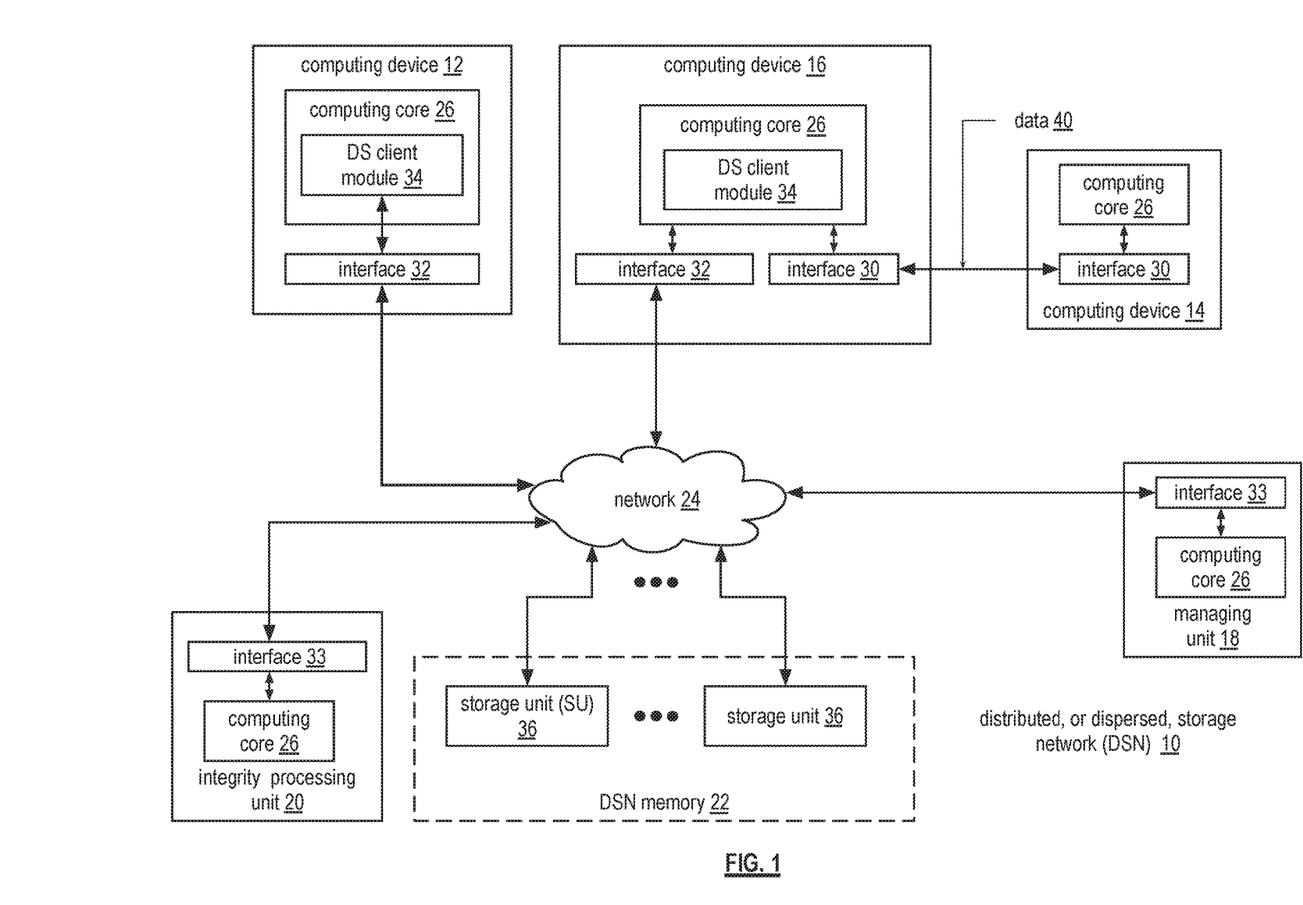
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
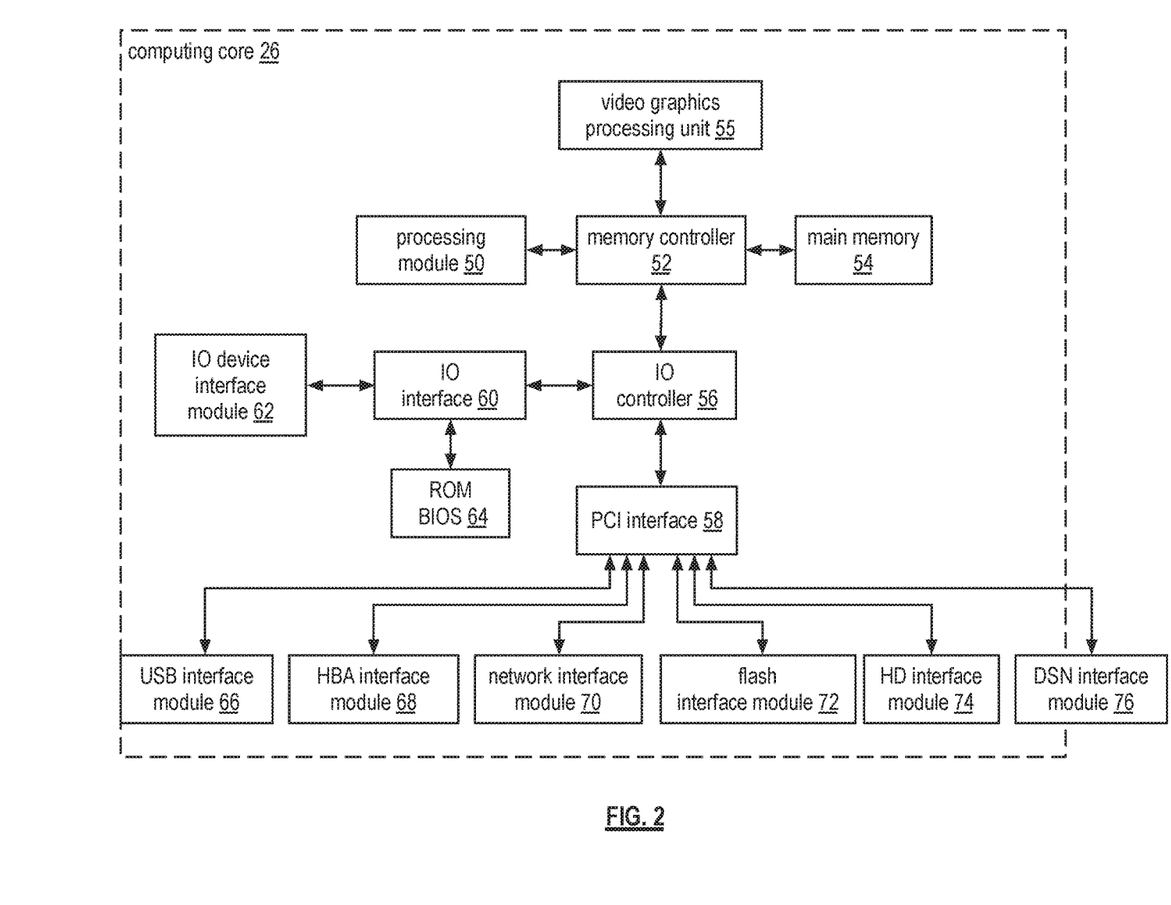
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
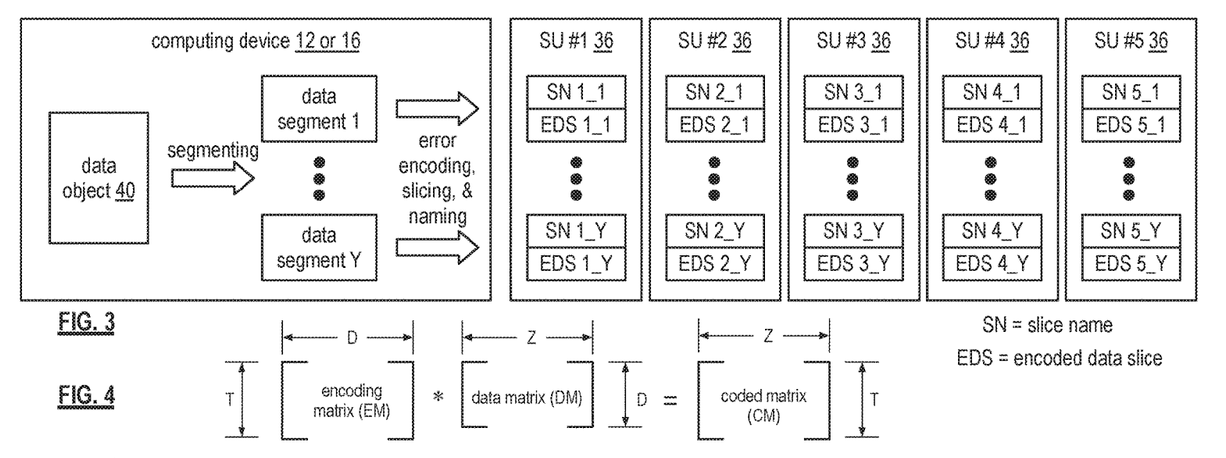
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
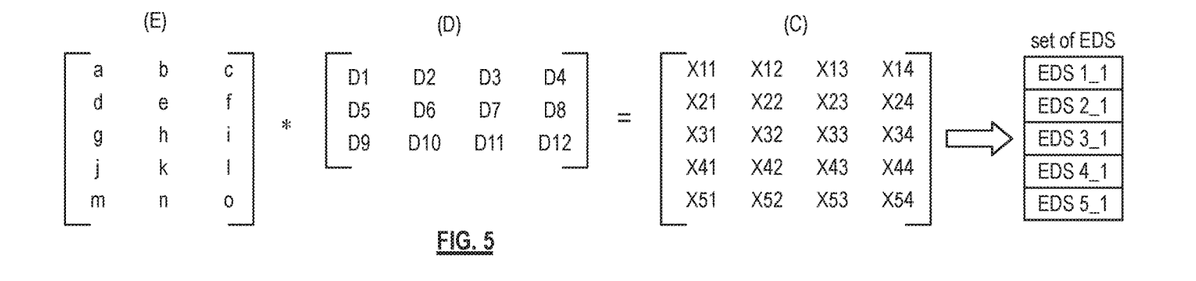
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
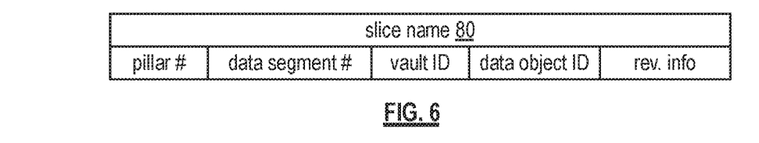
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
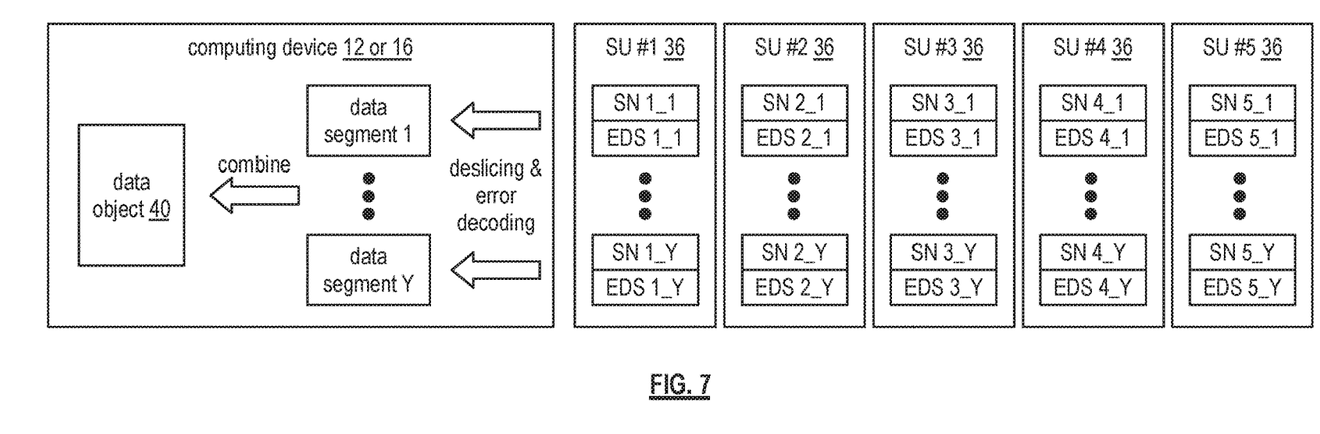
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
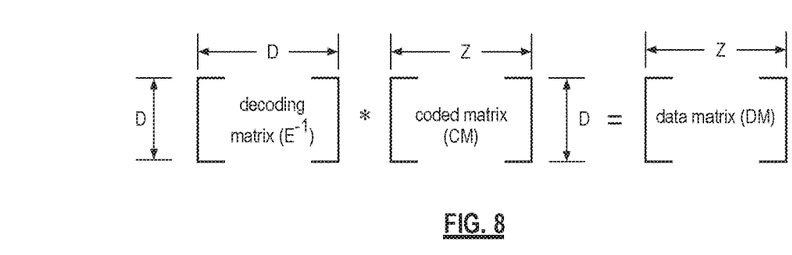
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
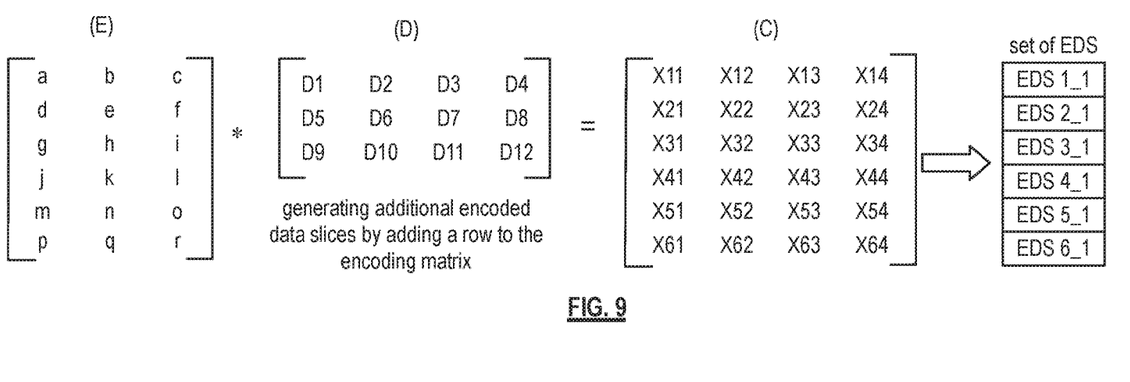
FIG. 9 is a schematic block diagram of another specific example of an error encoding function in accordance with the present invention.

FIG. 9 illustrates a specific example of Cauchy Reed-Solomon encoding with a pillar number (T) of six and a decode threshold number of three. In this example, similar to the example in FIG. 5, a first data segment is divided into twelve data blocks (D1-D12), however unlike the example in FIG. 5, this example includes a sixth row being added to the encoding matrix. Therefore, when multiplying the encoding matrix by the data matrix, a coding matrix with six rows of coded data blocks is now produced, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), the fifth row of X51-X54 corresponds to a fifth encoded data slice (EDS 5_1), and the sixth row of X61-X64 corresponds to a sixth encoded data slice (EDS 6_1). Note the first number of the EDS designation corresponds to the pillar number and that the second number of the EDS designation corresponds to the data segment number.

Figure 10:
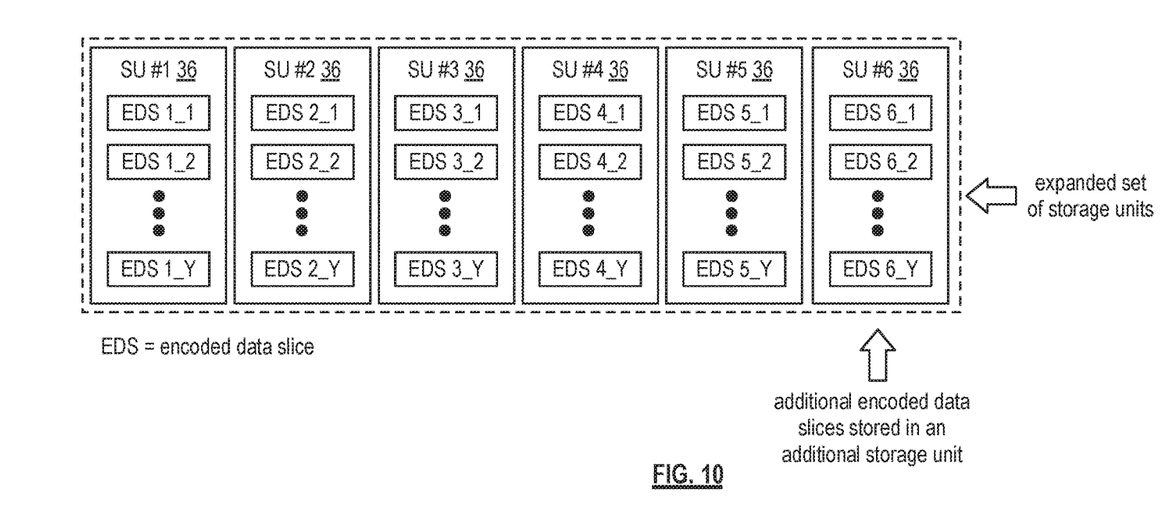
FIG. 10 is a schematic block diagram of another example of dispersed storage error encoding of data in accordance with the present invention.

FIG. 10 is a schematic block diagram of another example of dispersed storage error encoding of data. In the present example, Cauchy Reed-Solomon has been selected as the encoding function, the data segmenting protocol is to divide the data object into fixed sized data segments, and the per data segment encoding values include: a pillar width of 6 (instead of 5, thus creating an extra encoded data slice per set), a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

As a result of encoding, the computing device 12 or 16 produces a plurality of sets of encoded data slices, which are provided with their respective slice names to the storage units for storage. As shown, the computing device 12 or 16 stores a first set of encoded data slices (EDS 1_1-EDS 6_1) to the expanded set of storage units (e.g., SU #1-#6 36), stores a second set of encoded data slices (EDS 1_2-EDS 6_2) to the expanded set of storage units (e.g., SU #1-#6 36), etc., up to storing an nth set of encoded data slices (EDS 1_Y-EDS 6_Y) to the expanded set of storage units (e.g., SU #1-#6 36). Note the additional encoded data slices (e.g., EDS 6_1 through EDS 6_Y) are stored in an additional storage unit SU #6 36 (i.e., additional in comparison to the five storage units for a pillar width of five). Further note that although not specifically shown, each encoded data slice also includes a corresponding slice name.

Figure 11:
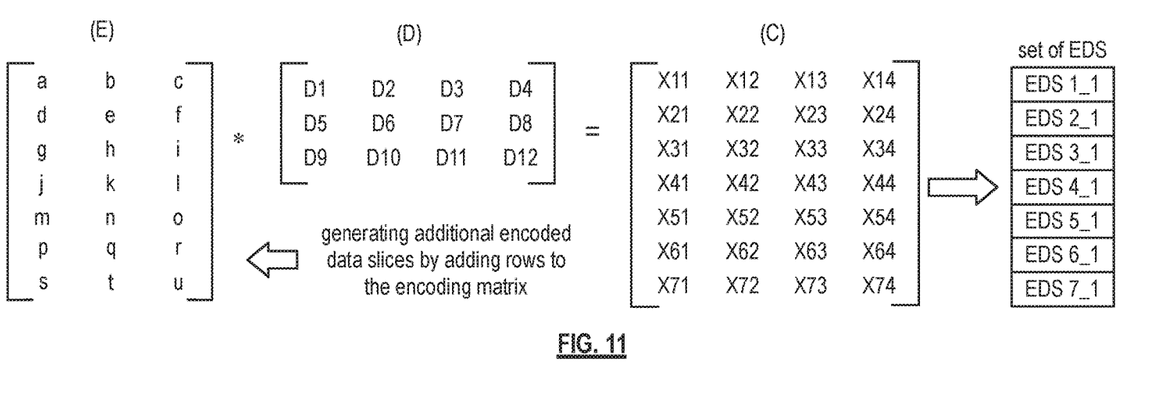
FIG. 11 is a schematic block diagram of yet another specific example of an error encoding function in accordance with the present invention.

FIG. 11 illustrates a specific example of Cauchy Reed-Solomon encoding with a pillar number (T) of seven and a decode threshold number of three. In this example, like in FIG. 5, a first data segment is divided into twelve data blocks (D1-D12), however unlike FIG. 5, this example the encoding matrix includes an additional sixth row and an additional seventh row. Therefore, when multiplying the encoding matrix by the data matrix, a coding matrix with seven rows of coded data blocks is produced, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), the fifth row of X51-X54 corresponds to a fifth encoded data slice (EDS 5_1), the sixth row of X61-X64 corresponds to a sixth encoded data slice (EDS 6_1), and the seventh row of X71-X74 corresponds to a seventh encoded data slice (EDS 7_1). Note the first number of the EDS designation corresponds to the pillar width number and that the second number of the EDS designation corresponds to the data segment number.

Figure 12:
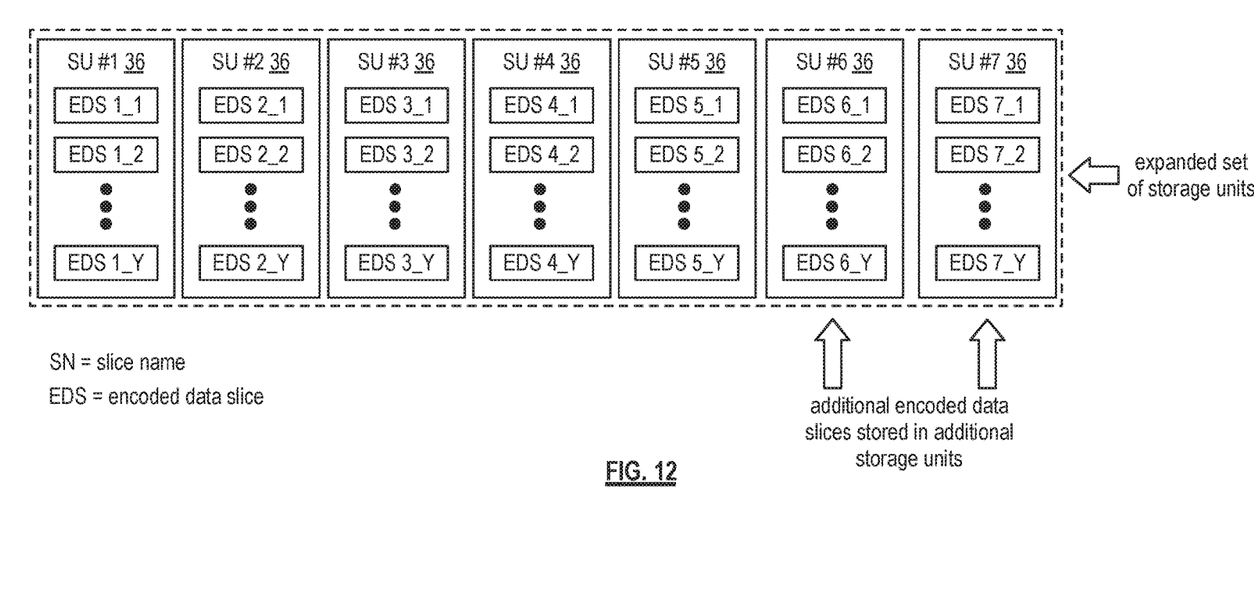
FIG. 12 is a schematic block diagram of yet another example of dispersed storage error encoding of data in accordance with the present invention.

FIG. 12 is a schematic block diagram of yet another example of dispersed storage error encoding of data. In the present example, Cauchy Reed-Solomon has been selected as the encoding function, the data segmenting protocol is to divide the data object into fixed sized data segments, and the per data segment encoding values include: a pillar width of 7 (instead of 5, thus creating two extra encoded data slices per set), a decode threshold of 3, a read threshold of 4, and a write threshold of 3. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

As a result of encoding, the computing device 12 or 16 produces a plurality of sets of encoded data slices, which are provided with their respective slice names to the storage units for storage. As shown, the computing device 12 or 16 stores a first set of encoded data slices (EDS 1_1-EDS 7_1) to the expanded set of storage units (e.g., SU #1-#7 36), stores a second set of encoded data slices (EDS 1_2-EDS 7_2) to the expanded set of storage units (e.g., SU #1-#7 36), up to storing an nth set of encoded data slices (EDS 1_Y-EDS 7_Y) to the expanded set of storage units (e.g., SU #1-#7 36). Note the additional encoded data slices (e.g., EDS 6_1-EDS 6_Y and EDS 7_1_-EDS 7_Y) are stored in additional storage units SU #6 36 and SU#7 36, respectively. Further note that although not specifically shown, each encoded data slice also includes a corresponding slice name.

Figure 13:
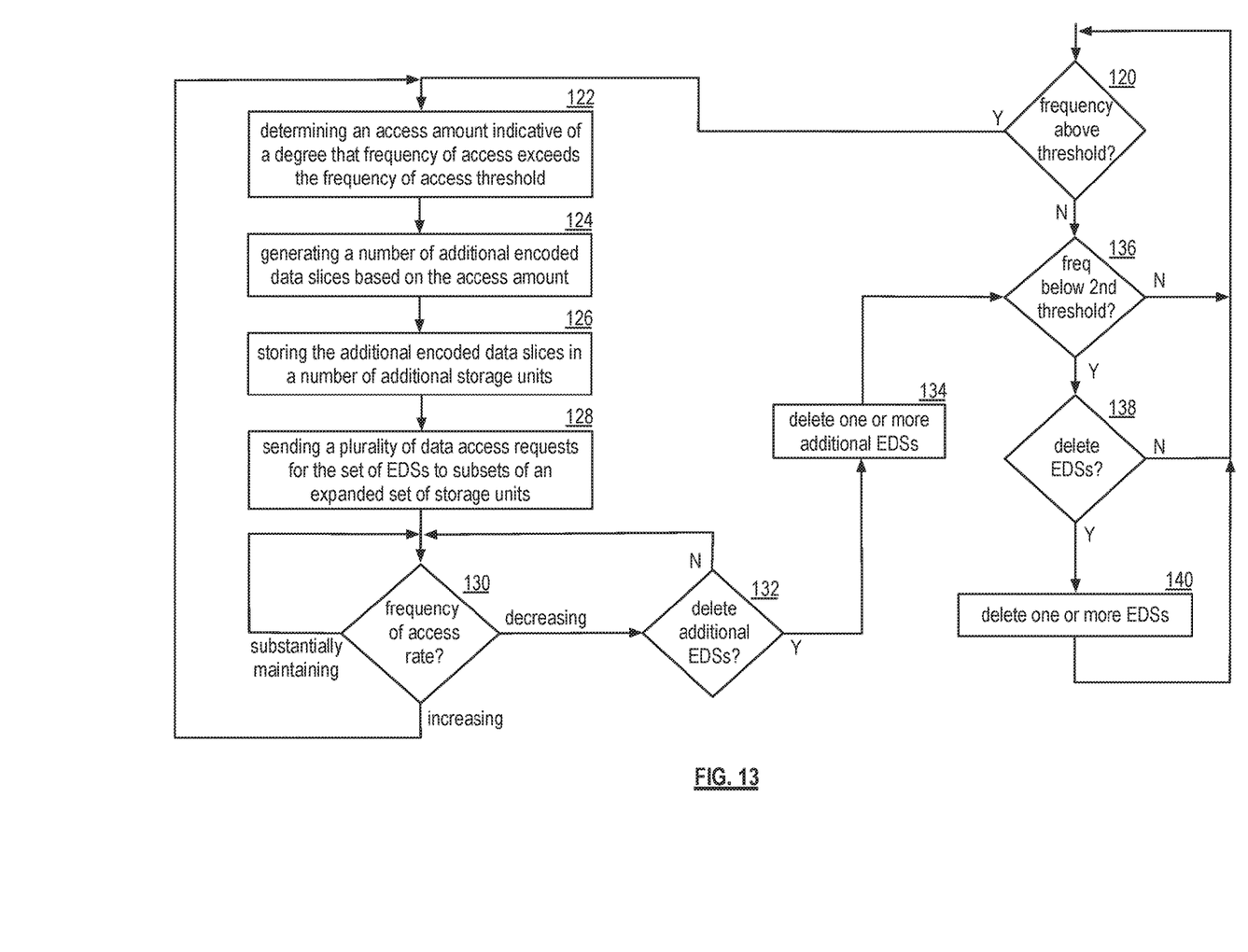
FIG. 13 is a logic flow diagram of generating additional encoded data slices for a frequently accessed set of encoded data slices in accordance with the present invention.

FIG. 13 is a flowchart illustrating an example of generating additional encoded data slices for a frequently accessed set of encoded data slices that includes step 120 where the computing device determines whether a frequency of access to a set of encoded data slices exceeds a frequently accessed threshold. When the frequency of access exceeds the frequently accessed threshold, the method continues at step 122 where the computing devices determines an access amount indicative of a degree in which the frequency of access exceeds the frequently accessed threshold. For example, when the frequency of access exceeds the frequently accessed threshold, the computing device determines the access amount based on one or more of determining a volume of the plurality of data access requests, determining a rate of increase of the plurality of data access requests, and determining a cost associated with the expanding the set of storage units based on one or more of historical performance, bandwidth, and available storage.

The method continues at step 124 where the computing device generates a number of additional encoded data slices for the set based on the access amount. For example, the computing device generates one additional encoded data slice when the frequency of access exceeds the threshold by 10%-20% and the cost analysis supports the expansion. As another example, the computing device generates two additional encoded data slices when the frequency of access exceeds the threshold by 20%-40% and the cost analysis supports the expansion. As yet another example, the computing device generates three additional encoded data slices when the frequency of access exceeds the threshold by 40% or more and the cost analysis supports the expansion.

The method continues with step 126 where the computing device stores the number of additional encoded data slices in a number of additional storage units. Note the set of storage units and the number of additional storage units produce an expanded set of storage units. The method continues with step 128 where the computing device sends data access requests for the set of encoded data slices to subsets of the expanded set of storage units in a distributed manner. Since a read and a write threshold are less than the pillar width number, a plurality of data access requests can be distributed among the storage units to effectively load balance the requests among all of the storage units in the set.

For example, and assuming a read/write threshold of 4 and a pillar width number of 6, a first request is sent to storage units 1-4, a second request is sent to storage units 2-5, a third request is sent to storage units 3-6, a fourth request is sent to storage units 1 and 4-6, a fifth request is sent to storage units 1, 2, 5, and 6, and so. Thus, over time, each storage unit receives about an equal number of requests, but less than all of the requests. Note if the read threshold is less than or equal to ½*pillar width number, then two read requests may be performed in parallel. For example, and assuming a read/write threshold of 4 and a pillar width number of 8, a first read request is sent to storage units 1-4 substantially concurrently with sending a second request to storage units 5-8.

The method continues at step 130 where the computing device determines whether the rate of the frequency of access has changed. If not, the method loops back to step 130. When the rate of the frequency of access is increasing, the method loops back to step 122 for the higher rate of the frequency access. When the rate of the frequency of access is decreasing, the method continues to step 132 where the computing device determines whether to delete one or more of the additional encoded data slices. For example, when the frequency of access is decreasing, the computing device determines a rate of decreasing and, based on the rate of decreasing, determines whether one or more of the additional encoded data slices are to be deleted. When the one or more of the additional encoded data slices are not to be deleted, the method loops back to step 130.

When the one or more of the additional encoded data slices are to be deleted, the method continues to step 134 where the computing device deletes one or more of the additional encoded data slices. When the additional encoded data slices have been deleted, the method continues at step 120 where the computing device determines whether the frequency of access is above the frequently access threshold. If yes, the method continues at step 122. If not, the method continues at step 136 where the computing device determines whether frequency of access has dropped below a second frequency access threshold, which is less than the frequency access threshold. If not, the method loops back to step 120.

When the frequency of access is below the second frequently accessed threshold, the method continues to step 138, where the computing device determines whether to delete one or more encoded data slices. For example, and assuming a read/write threshold of 4, a pillar width number of 5, and two additional encoded data slices have been created, the computing device determines whether to delete one or both of the additional encoded data slices. The computing device may further decide to delete all of the additional encoded data slices and one more encoded data slice, leaving only four encoded data slices when the frequency of access is well below the second threshold.

If computing device determines not to delete an encoded data slice, the method loops back to step 120. When the computing device determines to delete an encoded data slice, the method continues to step 140 where the computing device deletes an encoded data slice(s). The method then continues back to step 120.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of a dispersed storage network (DSN), the method comprises:
    determining whether a frequency of access via the DSN from one or more other computing devices to a set of encoded data slices that is stored in a set of storage units of the DSN exceeds a frequently accessed threshold, wherein a data segment of a data object is dispersed storage error encoded in accordance with first dispersed error encoding parameters including a first encoding matrix to produce the set of encoded data slices that is stored in the set of storage units of the DSN, wherein the set of encoded data slices includes a pillar width number and a decode threshold number, wherein the pillar width number corresponds to number of encoded data slices in the set of encoded data slices, and wherein the decode threshold number corresponds to a number of encoded data slices of the set of encoded data slices to retrieve a corresponding data segment of the data object;

when the frequency of access via the DSN from the one or more other computing devices to the set of encoded data slices that is stored in the set of storage units of the DSN exceeds the frequently accessed threshold, determining an access amount indicative of a degree in which the frequency of access exceeds the frequently accessed threshold;

generating a number of additional encoded data slices for the set of encoded data slices based on the access amount in accordance with second dispersed error encoding parameters including a second encoding matrix that includes at least one of more rows or more columns than the first encoding matrix;

storing the number of additional encoded data slices in a number of additional storage units within the DSN, wherein the set of storage units and the number of additional storage units produce an expanded set of storage units within the DSN that includes more storage units than the set of storage units; and sending, via the DSN from at least one of the computing device or the one or more other computing devices, a plurality of data access requests for the set of encoded data slices to different respective subsets of the expanded set of storage units in a distributed manner to load balance the plurality of data access requests for the set of encoded data slices among the expanded set of storage units within the DSN, wherein, over time, each storage unit of the expanded set of storage units within the DSN receives approximately an equal number of the plurality of data access requests and less than all of the plurality of data access requests.

2. The method of claim 1 further comprises:

when the frequency of access has exceeded the frequently accessed threshold and when the frequency of access is decreasing, determining a rate of the decreasing;

based on the rate of decreasing, determining whether one or more of the additional encoded data slices are to be deleted; and when the one or more of the additional encoded data slices are to be deleted, deleting the one or more of the additional encoded data slices.

3. The method of claim 2 further comprises:

when the additional encoded data slices have been deleted, determining whether the frequency of access is below a second frequently accessed threshold, wherein the second frequently accessed threshold is less than the frequently accessed threshold;

when the frequency of access is below the second frequently accessed threshold, determining whether to delete one or more encoded data slices of the set of encoded data slices; and when the one or more encoded data slices of the set of encoded data slices is to be deleted, deleting the one or more encoded data slices of the set of encoded data slices.

4. The method of claim 1 further comprises:

determining whether the frequency of access is below a second frequently accessed threshold, wherein the second frequently accessed threshold is less than the frequently accessed threshold;

when the frequency of access is below the second frequently accessed threshold, determining whether to delete one or more encoded data slices of the set of encoded data slices; and when the one or more encoded data slices of the set of encoded data slices is to be deleted, deleting the one or more encoded data slices of the set of encoded data slices.

5. The method of claim 1, wherein the sending the plurality of data access requests for the set of encoded data slices to the subsets of the expanded set of storage units further comprises:

sending a first data access request of the plurality of data access requests to a first subset of the expanded set of storage units; and sending, substantially concurrently with the first data access request, a second data access request of the plurality of data access requests to a second subset of the expanded set of storage units when an expanded pillar width number is equal to or greater than twice a read threshold number, wherein the expanded pillar width number corresponds to the expanded set of storage units.

6. The method of claim 1, wherein the generating the number of additional encoded data slices further comprises:

determining a cost associated with the expanded set of storage units;

when the cost is below a first cost threshold, generating a first number of additional encoded data slices;

when the cost is equal to or above the first cost threshold, generating a second number of additional encoded data slices, wherein the second number is less than the first number, and wherein the cost associated with the expanded set of storage units includes on at least one of:

historical performance;

bandwidth; or available storage.

7. The method of claim 1, wherein the determining the access amount comprises one or more of:

determining a volume of the plurality of data access requests;

determining a rate of increase of the plurality of data access requests; and determining that the frequency of access has exceeded a second frequently accessed threshold, which is greater than the frequently accessed threshold.

8. A computing device comprises:

an interface configured to interface and communicate with a dispersed storage network (DSN);

memory; and a processing module operably coupled to the memory and the interface, wherein the processing module is operable to:

determine whether a frequency of access via the DSN from one or more other computing devices to a set of encoded data slices that is stored in a set of storage units of the DSN exceeds a frequently accessed threshold, wherein a data segment of a data object is dispersed storage error encoded in accordance with first dispersed error encoding parameters including a first encoding matrix to produce the set of encoded data slices that is stored in the set of storage units of the DSN, wherein the set of encoded data slices includes a pillar width number and a decode threshold number, wherein the pillar width number corresponds to number of encoded data slices in the set of encoded data slices, and wherein the decode threshold number corresponds to a number of encoded data slices of the set of encoded data slices to retrieve a corresponding data segment of the data object;

when the frequency of access via the DSN from the one or more other computing devices to the set of encoded data slices that is stored in the set of storage units of the DSN exceeds the frequently accessed threshold, determine an access amount indicative of a degree in which the frequency of access exceeds the frequently accessed threshold;

generate a number of additional encoded data slices for the set of encoded data slices based on the access amount in accordance with second dispersed error encoding parameters including a second encoding matrix that includes at least one of more rows or more columns than the first encoding matrix;

store the number of additional encoded data slices in a number of additional storage units within the DSN, wherein the set of storage units and the number of additional storage units produce an expanded set of storage units within the DSN; DSN that includes more storage units than the set of storage units; and send, via the interface and via the DSN from at least one of the computing device or the one or more other computing devices, a plurality of data access requests for the set of encoded data slices to different respective subsets of the expanded set of storage units in a distributed manner to load balance the plurality of data access requests for the set of encoded data slices among the expanded set of storage units within the DSN, wherein, over time, each storage unit of the expanded set of storage units within the DSN receives approximately an equal number of the plurality of data access requests and less than all of the plurality of data access requests.

9. The computing device of claim 8, wherein the processing module is further operable to:

when the frequency of access has exceeded the frequently accessed threshold and when the frequency of access is decreasing, determine a rate of the decreasing;

based on the rate of decreasing, determine whether one or more of the additional encoded data slices are to be deleted; and when the one or more of the additional encoded data slices are to be deleted, delete one or more of the additional encoded data slices.

10. The computing device of claim 9, wherein the processing module is further operable to:

when the additional encoded data slices have been deleted, determine whether the frequency of access is below a second frequently accessed threshold, wherein the second frequently accessed threshold is less than the frequently accessed threshold;

when the frequency of access is below the second frequently accessed threshold, determine whether to delete one or more encoded data slices of the set of encoded data slices; and when the one or more encoded data slices of the set of encoded data slices is to be deleted, delete the one or more encoded data slices of the set of encoded data slices.

11. The computing device of claim 8, wherein the processing module is further operable to:

determine whether the frequency of access is below a second frequently accessed threshold, wherein the second frequently accessed threshold is less than the frequently accessed threshold;

when the frequency of access is below the second frequently accessed threshold, determine whether to delete one or more encoded data slices of the set of encoded data slices; and when the one or more encoded data slices of the set of encoded data slices is to be deleted, delete the one or more encoded data slices of the set of encoded data slices.

12. The computing device of claim 8, wherein the processing module is further operable to send, via the interface, the plurality of data access requests for the set of encoded data slices to the subsets of the expanded set of storage units by:

sending, via the interface, a first data access request of the plurality of data access requests to a first subset of the expanded set of storage units; and sending, via the interface, substantially concurrently with the first data access request, a second data access request of the plurality of data access requests to a second subset of the expanded set of storage units when an expanded pillar width number is equal to or greater than twice a read threshold number, wherein the expanded pillar width number corresponds to the expanded set of storage units.

13. The computing device of claim 8, wherein the processing module is further operable to generate the number of additional encoded data slices by:

determining a cost associated with the expanded set of storage units;

when the cost is below a first cost threshold, generating a first number of additional encoded data slices;

when the cost is equal to or above the first cost threshold, generating a second number of additional encoded data slices, wherein the second number is less than the first number, and wherein the cost associated with the expanded set of storage units includes on at least one of:

historical performance;

bandwidth; or available storage.

14. The computing device of claim 8, wherein the processing module is further operable to determine the access amount by:

determining a volume of the plurality of data access requests;

determining a rate of increase of the plurality of data access requests; and determining that the frequency of access has exceeded a second frequently accessed threshold, which is greater than the frequently accessed threshold.

\* \* \* \* \*